US006693590B1

United States Patent
Toplicar et al.

(12) United States Patent
(10) Patent No.: US 6,693,590 B1
(45) Date of Patent: Feb. 17, 2004

(54) METHOD AND APPARATUS FOR A DIGITAL PHASED ARRAY ANTENNA

(75) Inventors: James R. Toplicar, Plano, TX (US); Guillermo V. Andrews, Plano, TX (US); Gary A. Frazier, Garland, TX (US); Krishna K. Agarwal, Plano, TX (US); Paul E. Doucette, Plano, TX (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/478,035

(22) Filed: Jan. 5, 2000

Related U.S. Application Data

(60) Provisional application No. 60/133,387, filed on May 10, 1999.

(51) Int. Cl.[7] ............................. G01S 3/16; H01Q 3/00
(52) U.S. Cl. ...................... 342/383; 342/377; 342/372
(58) Field of Search ................................. 342/372, 368, 342/195, 377, 383; 375/340, 343

(56) References Cited

U.S. PATENT DOCUMENTS

| | | | | |
|---|---|---|---|---|
| 3,887,918 A | * | 6/1975 | Bailey ..................... 342/195 |
| 4,688,045 A | * | 8/1987 | Knudsen ................. 342/377 |
| 4,749,995 A | | 6/1988 | Hopwood et al. ........ 342/371 |
| 4,839,652 A | * | 6/1989 | O'Donnell et al. ....... 341/122 |
| 4,886,069 A | * | 12/1989 | O'Donnell ............... 600/457 |
| 4,983,970 A | * | 1/1991 | O'Donnell et al. ....... 341/122 |
| 5,084,708 A | * | 1/1992 | Champeau et al. ....... 342/377 |
| 5,223,843 A | * | 6/1993 | Hutchinson .............. 342/352 |
| 5,271,034 A | * | 12/1993 | Abaunza ................ 342/357.12 |
| 5,414,433 A | | 5/1995 | Chang .................... 342/375 |
| 5,461,389 A | | 10/1995 | Dean ...................... 342/375 |
| 5,475,392 A | * | 12/1995 | Newberg et al. ......... 342/375 |
| 5,517,529 A | * | 5/1996 | Stehlik ................... 329/314 |
| 5,764,187 A | | 6/1998 | Rudish et al. ............ 342/372 |
| 5,943,010 A | * | 8/1999 | Rudish et al. ............ 342/372 |
| 6,031,485 A | * | 2/2000 | Cellai et al. ............. 342/131 |
| 6,052,085 A | * | 4/2000 | Hanson et al. ........... 342/373 |
| 6,141,371 A | * | 10/2000 | Holmes et al. ........... 375/130 |
| 6,160,505 A | * | 12/2000 | Vaishampayan ......... 341/143 |
| 6,191,735 B1 | | 2/2001 | Schineller ............... 342/375 |
| 6,380,908 B1 | | 4/2002 | Andrews et al. ......... 343/853 |

FOREIGN PATENT DOCUMENTS

| | | | | |
|---|---|---|---|---|
| GB | 2 130 798 A | 6/1984 | ............ H01Q/3/26 |
| GB | 2 313 711 A | 12/1997 | ............ H01Q/3/26 |
| WO | WO 01/67548 A2 | 9/2001 | ............ H01Q/3/26 |

OTHER PUBLICATIONS

Guirong, Guo et al, "Mixer Free All Digital Quadrature Modulation" 1998 4th Int'l Conf. on Signal Processing Proceedings, Oct. 1998, pp. 1704–1707 vol. 2.*

Song, William, "A New 3–GSPS 65–GOPS UHF Digital Radar Receiver and Its Performance Characteristics" Conf. Record of th 31st Asilomar Conference on Signals, Systems & Computers, 2–5 No. 1997. pp. 1542–1546, vol. 2.*

Brown, Allison and Barry Wolt, "Digital L–Band Receiver Architecture with Direct RF Sampling", IEEE Position, Location and Navigation Symposium, Apr. 11–15, 1994, pp. 209–216.*

(List continued on next page.)

Primary Examiner—Gregory C. Issing
(74) Attorney, Agent, or Firm—Baker Botts L.L.P.

(57) ABSTRACT

A digital phased array antenna comprises a plurality of antenna elements, each element receiving an incoming signal. An analog-to-digital converter is coupled to at least one of the antenna elements to convert the incoming signal to a multi-bit digital signal. A demodulator or de-ramp circuit is coupled to the analog-to-digital converter to reduce the bandwidth of the multi-bit signal.

11 Claims, 4 Drawing Sheets

OTHER PUBLICATIONS

Thompson, Rick et al, "An 8–Bit 2–Gigasample/Second A/D Converter Multichip Module for Digital Receiver Demonstration on Navy AN/APS–145 E2–C Airborne Early Warning Aircraft Radar", IEEE Trans on CPMT Part B, vol. 21, No. 4, Nov. 1998, pp. 447–462.*

Brinegar, C. et al, "Design of an Integrated RF Filter for the Direct Digitization Front End of a DUal GPS/GLONASS Software Radio Receiver", IEEE RAWCON '98 Proceedings, Aug. 1998, pp. 277–280.*

Ho, K.C. et al, "A Digital Quadrature Demodulation System", IEEE Trans. on AES, vol. 32, No. 4, Oct. 1996, pp. 1218–1227.*

Brown, A. et al, "Digital Downconversion Test Results with a Broadband L–Band GPS Receiver", IEEE Digital Avionics Systems Conf. Nov. 1994, pp. 426–431.*

Eerola, V. et al, "Direct Conversion Using Lowpass Sigma–Delta Modulation",. Proc. IEEE Int'l Symposium on Circuits and Systems, May 1992, pp. 2653–2656.*

U. S. patent application Ser. No. 09/519,069, filed Mar. 3, 2000, entitled *"Digital Phased Array Architecture and Associated Method"*, inventor Gary A. Frazier, Attorney Docket No. RAYT:009, Mar. 3, 2000.

Radar Digital Beamforming, A.C.C. Wong (Standard Telecommunication Laboratories, Harlow, Essex, U.K., Military Microwaves '82, Conference Proceedings, date of conference Oct. 20, 1983.

Stretch: A Time–Transformation Technique, William J. Caputi, Jr., Member, IEEE, Institute of Science and Technology, University of Michigan, Ann Arbor, Michigan, 48107, IEEE Transactions on Aerospace and Electronics Systems, vol. AES–7, No. 2, Mar. 1971.

U.S. patent application Ser. No. 10/028,009, filed Dec. 21, 2001, entitled "Method and Apparatus for Processing Signals in an Array Antenna System", by inventors Paul E. Doucette, et al., 37 pages of text and 4 pages of drawings. (Attorney Docket 004578.1147).

Steyskal, Hans, Hanscom Air Force Base, MA, "Digital Beamforming at Rome Laboratory", *Microwave Journal*, US, Horizon House, Dedham, vol. 39, No. 2, Feb. 1, 1996, XP 000580228, Special Report, entire document (14 pages), Feb. 1996.

PCT International Search Report Dated Dec. 29, 2000 for PCT/US 00/12340 Filed May 5, 2000.

* cited by examiner

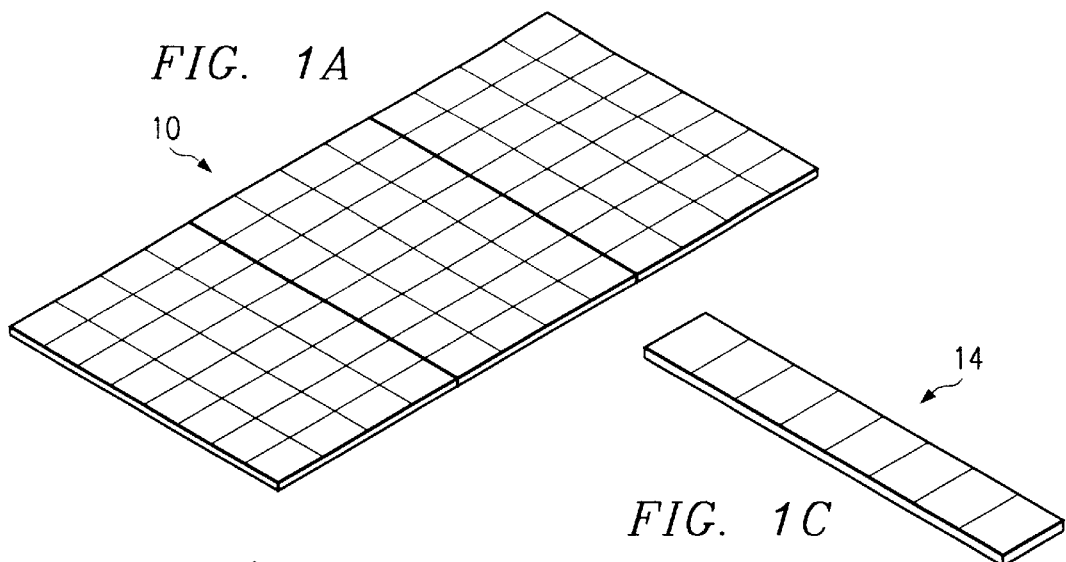
FIG. 1A
FIG. 1C
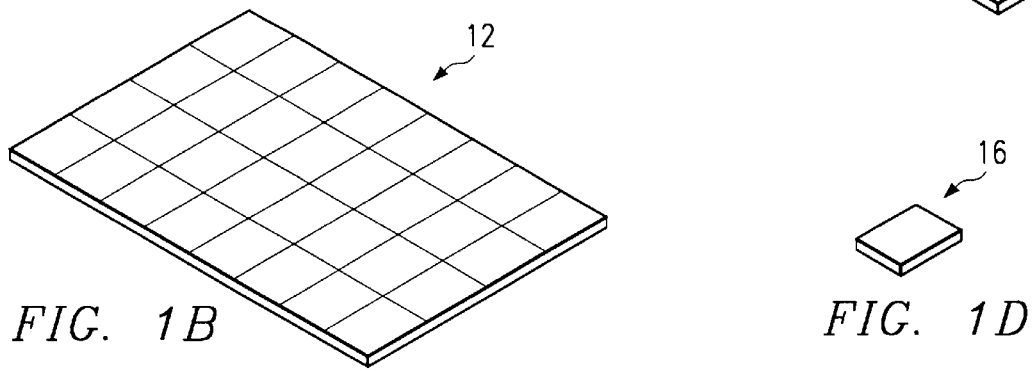
FIG. 1B
FIG. 1D
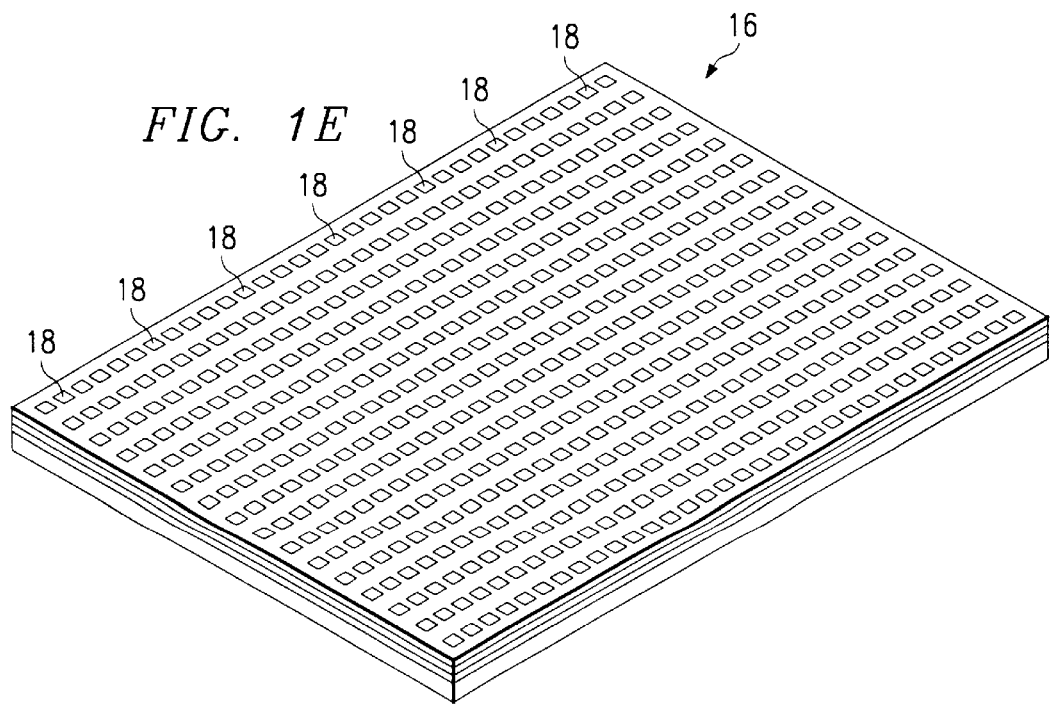
FIG. 1E

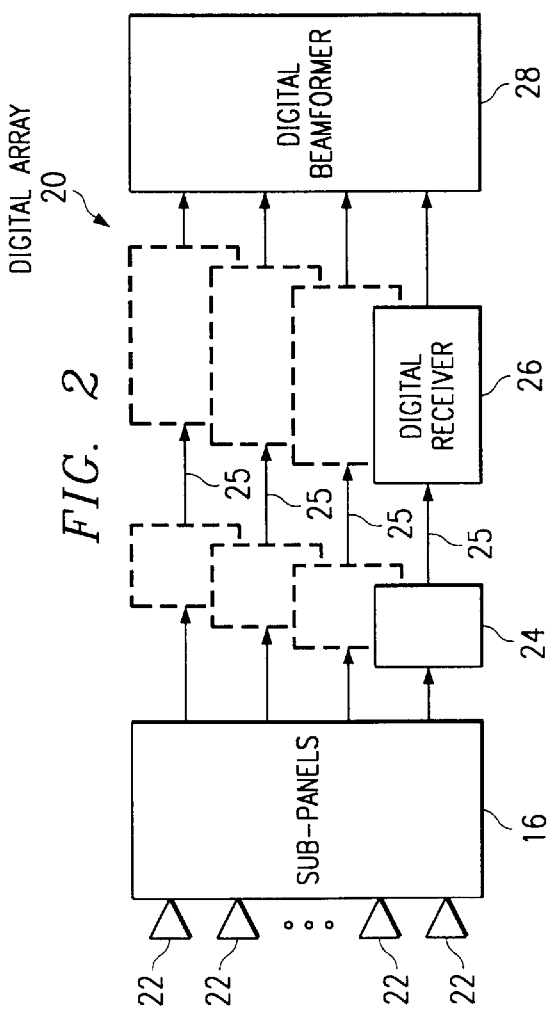
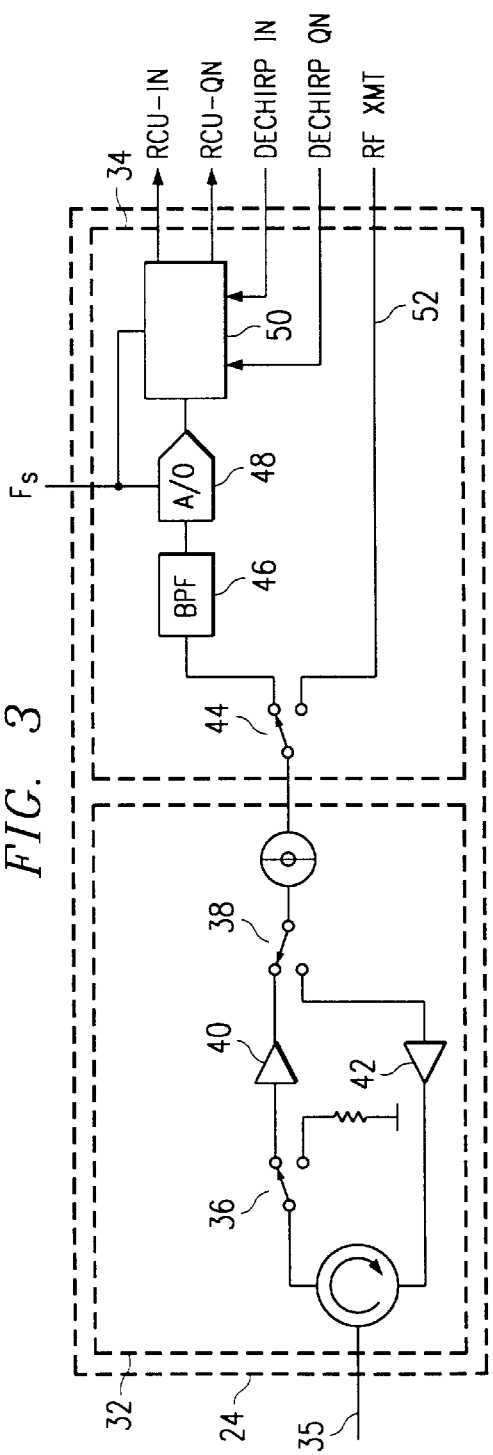

METHOD AND APPARATUS FOR A DIGITAL PHASED ARRAY ANTENNA

RELATED APPLICATION

This application claims the benefit of U.S. provisional application Ser. No. 60/133,387, filed May 10, 1999, entitled METHOD AND APPARATUS FOR A DIGITAL PHASED ARRAY ANTENNA.

TECHNICAL FIELD OF THE INVENTION

This invention generally relates to phased array antennas and, in particular, to a method and apparatus for a digital phased array radar antenna.

BACKGROUND OF THE INVENTION

Phased array antenna systems generally employ fixed, planar arrays of individual, or subarrays of, transmit and receive elements. Phased array antennas receive signals at the individual elements and coherently reassemble the signals over the entire array by compensating for the relative phases and time delays between the elements. For transmission, the relative phase compensation is applied to the signals at each of the individual elements to electronically steer the beam.

In conventional phased array antennas, the phase shifts and time delays are applied in the analog domain. Typically, the received signals are combined across an array using analog microwave combining circuits and down-converted to an intermediate frequency using analog microwave mixer components. The intermediate frequency is further processed in the analog domain prior to digitization at a low baseband frequency. This analog processing approach is generally not applicable to large arrays, since wide-bandwidth signals do not retain phase coherency over large arrays. Wideband signal processing in large phased arrays requires programmable true-time-delay components to combine the wideband signals over the array. Programmable, analog, true time delays are generally large, complex and costly components.

To help solve this problem for wideband signals, digital processing of the antenna signals has been attempted. This process typically involves digitally processing the received signals at an intermediate frequency. This digital solution requires high precision, high speed, analog-to-digital converters with large power demands to digitize the intermediate frequency.

SUMMARY OF THE INVENTION

In accordance with the present invention, the disadvantages and problems associated with previous phased array antennas have been substantially reduced.

In particular, the present invention provides a method and apparatus for a digital phased array antenna. The digital phase array antenna comprises a plurality of antenna elements, each element receiving an incoming signal, and an analog-to-digital converter coupled through RF amplification and matching circuitry to at least one of the antenna elements to convert the incoming signal to a multi-bit digital signal. Also included is a demodulator or de-ramp circuit coupled to the analog-to-digital converter for reducing the bandwidth of the multi-bit signal.

Also in accordance with the present invention, a method for processing a received incoming signal at a digital phase array antenna is provided. This method comprises receiving an incoming signal at an antenna element. The signal is converted to a multi-bit digital signal and the bandwidth of the multi-bit signal is reduced in the digital domain.

Further in accordance with the present invention, there is provided an RF module comprising radio frequency circuitry receiving a signal from at least one antenna element and amplify the signal. The RF module also includes digital transmit and receive circuitry coupled to the radio frequency circuitry. The digital transmit and receive circuitry includes an analog-to-digital converter for converting the signal to a multi-bit digital signal.

BRIEF DESCRIPTION OF THE DRAWINGS

For a more complete understanding of the present invention, and for further features and advantages, reference is now made to the following description taken in conjunction with the accompanying drawings, in which:

FIGS. 1A, 1B, 1C, 1D and 1E illustrate an antenna array in accordance with the present invention;

FIG. 2 illustrates a digital antenna array signal processing system for the antenna array of FIG. 1A in accordance with the teachings of the present invention;

FIG. 3 illustrates a digital radio frequency module for the system of FIG. 2;

DETAILED DESCRIPTION OF THE INVENTION

Figure 4:
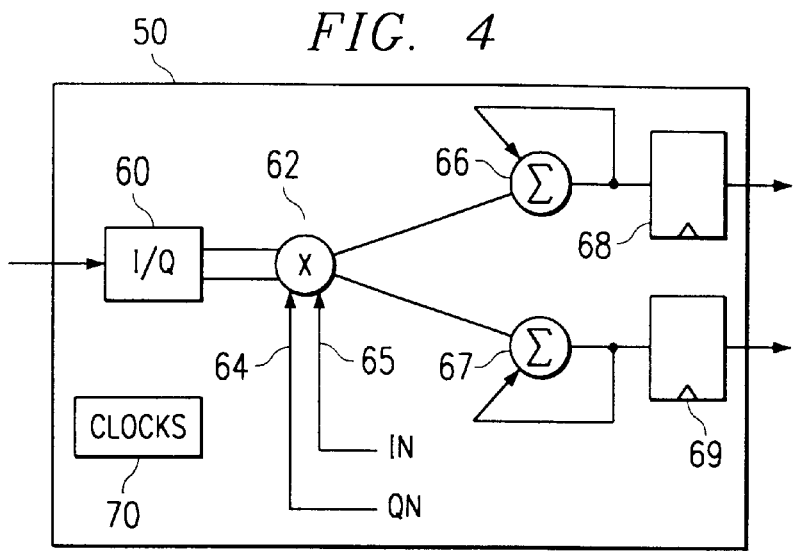
FIG. 4 is a schematic drawing of a demodulator or de-ramp circuit in accordance with the teachings of the present invention.

FIGS. 1A, 1B, 1C, 1D, and 1E illustrate an exemplary antenna array 10 comprising three (3) panels 12. Each panel is divided into a number of long subarrays (LSA) 14. In this exemplary array, each panel has four (4) long subarrays 14. Each long subarray 14 comprises eight (8) sub-panels 16. Therefore, in the antenna array 10 there are 96 sub-panels 16. On each sub-panel 16 there are 512 antenna elements 18, each capable of receiving and transmitting a signal. In the antenna array 10 there are 49,152 antenna elements 18.

Referring now to FIG. 2, there is illustrated a digital antenna array signal processing system in accordance with the present invention. The digital antenna array signal processing system comprises sub-panels 16 coupled to radio frequency modules 24. The RF modules 24 are coupled to digital receivers 26, each having an output coupled to a digital beamformer 28.

FIG. 2 illustrates radar signals 22 received by the elements 18 of sub-panels 16. In a typical phased array antenna, each element 18 of sub-panel 16 receives radar signals 22.

The RF modules 24 receive radar signals 22 from antenna elements 18 and converts these signals from an analog signal format to a digital signal format on lines 25. In one embodiment, one RF module 24 receives and combines the signal from eight antenna elements 18 in subpanel 16. Other combinations, including providing an analog-to-digital converter for each element, is also possible.

In conventional phased array receiver systems, analog-to-digital conversion occurs after all the output RF signals of each element in the array are first additively combined and then converted to an intermediate frequency. Often the signal combining process is carried out in layers with a subset of elements combined at a subarray level and the separate subarray outputs combined into one or more final signals. The final signal is then conveyed to an analog-to-digital converter, which provides a sampled, digital representation of the overall received signal to digital processing circuitry.

Normally, in conventional phased array receiver systems, the element combining process causes the overall received RF signal power to increase roughly as the number of elements while the overall radio frequency noise power increases roughly as the square root of the number of elements. As a result, in conventional systems, the signal presented to the input of the analog-to-digital converter tends to be above the noise floor of the received radar signal. That is, the signal-to-noise ratio of the information at the input of the analog-to-digital converter tends to be much greater than unity. Generally, the effective signal-to-noise ratio of the analog-to-digital converter must be equal to or greater than the best case signal-to-noise ratio of the input signal. Also, the dynamic range of the analog-to-digital converter, the range of signals that the analog-to-digital converter can accommodate without saturation, must be equal to or greater than the dynamic range of the input signal. Therefore, in conventional systems a multi-bit analog-to-digital converter must be used to avoid loss of information due to noise or saturation effects. In a typical conventional system a ten-bit analog-to-digital converter is necessary.

However, the signal-to-noise ratio of radio frequency signals received by a single element or a small number of elements within a phased array antenna is generally less than unity. The total noise power due to external effects such as atmospheric noise, and internal noise due to temperature effects tend to be greater than the power of the desired radio frequency signal at each element. Since the RF module 24 of the present invention receives signals directly from antenna elements 18 of sub-panel 16, the received signals are generally below the noise floor. This allows for the use of an analog-to-digital converter with comparably fewer bits, a less demanding signal-to-noise ratio, and dynamic range. In one embodiment of the present invention, a one-bit analog-to-digital converter, also known as a one-bit quantizer, is sufficient for use with the RF module 24.

Each RF module 24 outputs a binary value of "1" (positive one) when receiving a positive input voltage and outputs a value of "−1" (negative one) when receiving a negative voltage. The average value of the output of an RF module 24 follows the average value of the input signal level. In the embodiment where the RF module 24 includes a single-bit quantizer, the RF module 24 receives an analog signal of Gaussian distributed noise with the mean value of the noise biased by the actual radar signal.

According to the well known Sampling Theorem, to accurately reproduce the original signal from a sampled signal, the sampling must occur at what is known as the Nyquist rate. Usually, a filter is placed before the analog-to-digital converter in the RF module to prevent signals with a frequency above the filtered frequency from being sampled by the converter.

After converting radar signal 22 to a digital signal on line 25 the digital signal is applied to a digital receiver 26 which performs various signal processing operations on the digital signal. These may include filtering, correcting for Doppler error, adjusting the bandwidth of the signal, extracting the relative phase of the signal output from each sub-panel array and other operations.

After processing in the digital receiver 26, the processed signal on line 27 is applied to beamformer 28 which combines signals from multiple digital receivers 26 to achieve a composite signal input across array 10. After the signal from one array is recovered other arrays can be combined and processed to increase signal-to-noise ratio or to perform other processing operations on the effectively larger array.

FIG. 3 illustrates a digital radio frequency module (DRFM) 30 in accordance with the teachings of the present invention. Digital RF module 30 comprises a radio frequency circuit 32 coupled to a digital transmit/receive circuit 34. In the system of FIG. 1, there would be one DRFM 30 for every eight antenna elements 18 in a sub-panel 16. This is an example only and other possible combinations of elements to RF modules are within the scope of the present invention.

The RF circuit 32 receives incoming signals on a line 35 from antenna elements 18 and amplifies these signals in an amplifier 40. Switches 36, 38 and 44 are illustrated in the receive position to receive a signal. After amplification the signal passes to digital transmit/receive circuit 34.

In digital transmit/receive circuit 34, the amplified signal, consisting of both signal and noise, is filtered by a low-pass or band-pass filter 46 to prevent aliasing in the analog-to-digital conversion process. The signal is then applied to an analog-to-digital converter 48, such as a single-bit analog-to-digital converter. As described above, analog-to-digital converter 48 inputs a signal and outputs a positive one or a negative one depending on if the input voltage is greater or less than zero volts.

The digital signal on line 25 is input to a demodulator or de-ramp circuit 50 to reduce the bandwidth of the signal by convolving the output of analog-to-digital converter 48 with known generated reference signals, as will be explained with reference to FIG. 4. In one embodiment, the reference signals DECHRIP IN and DECHRIP QN are time-delayed versions of signals transmitted from the array at an earlier time. In one exemplary radar embodiment, a waveform may be modulated linearly in frequency over time and transmitted from the array whereupon subsequent reflection of the transmitted signal is eventually received by the array and demodulated using a time-delayed copy of the original waveform. The output of the demodulator or de-ramp circuit 50 is the in-phase, RCU IN, (zero degree) and quadrature-phase, RCU QN, (ninety degree) components of the demodulated or de-ramped signal.

In the signal transmission mode, an RF transmit line 52 provides a signal path for transmission of signals from the elements 18 of the antenna array 10. In the transmit mode, switches 36, 38 and 44 would be set to the opposite state as that shown in FIG. 3.

Referring to FIG. 4, there is illustrated a schematic diagram of demodulator or de-ramp circuit 50. Demodulator or de-ramp circuit 50 comprises an in-phase/quadrature phase converter 60 coupled to a complex multiplier 62 having an input for receiving an in-phase reference signal on line 65 and an input for receiving a quadrature-phase reference signal on line 64. In-phase/quadrature-phase waveform generator 60 receives the output of the analog-to-digital converter 48 and outputs a complex number representation of the received signal. The in-phase and quadrature-phase output signals from the complex multiplexer 62 are applied to synchronous accumulators 66 and 67. The output of accumulators 66 and 67 are separately transmitted to holding registers 68 and 69 to be loaded with the accumulated values every 16 FS/2 clock cycles. The accumulated in-phase and quadrature-phase digital signals make up the complex information.

Figure 6A:
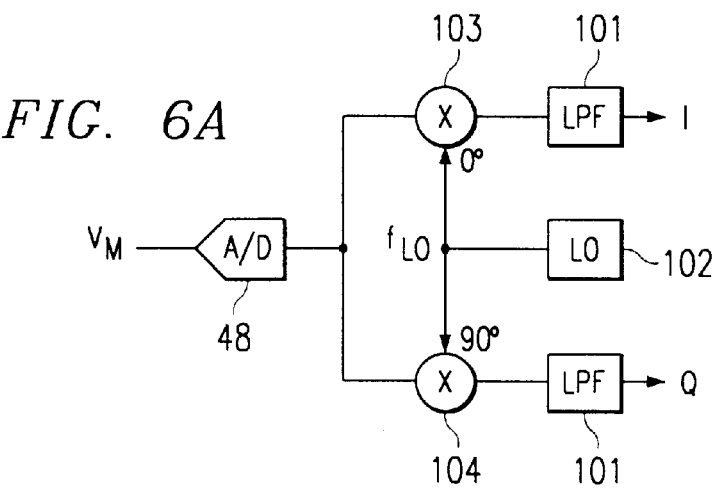
FIG. 6A is a block diagram of an In-Phase and Quadrature-Phase converter for the system of FIG. 2.

Referring to FIG. 6A, the in-phase/quadrature-phase converter 60 generates the in-phase and quadrature-phase signals by multiplying the digital output from analog-to-digital converter 48 by a first and second frequency generated by a digital local oscillator 102 in digital multipliers 103 and 104, respectively. Digital local oscillator 102 outputs a first frequency and a second frequency shifted by 90 degrees for multiplication with the output of the analog-to-digital converter 48. To complete the process, the digital in-phase and quadrature-phase signals from the multipliers 103 and 104, respectively, are low-pass filtered by operation of filters 101 to remove alias frequency components.

Figure 6B:
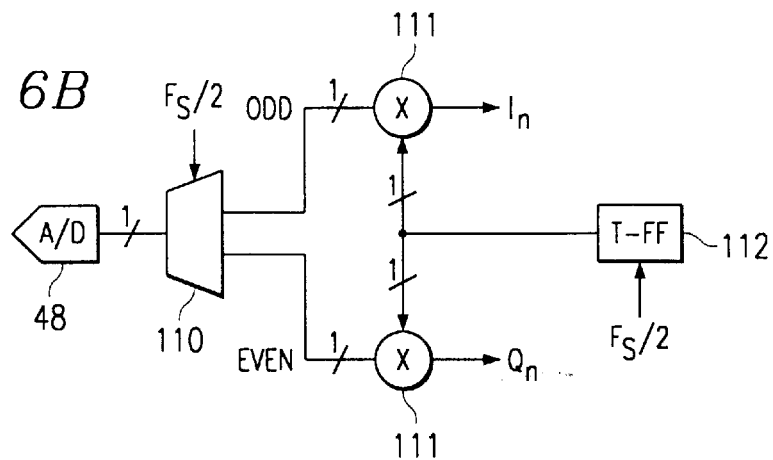
FIG. 6B is a block diagram of an In-Phase and Quadrature-Phase converter in accordance with the teachings of the present invention.

When the analog-to-digital converter 48 is a single-bit quantizer, generation of in-phase and quadrature-phase signals is simplified by operation of the circuit shown in FIG. 6B. Sample signals from the 1-bit analog-to-digital converter 48 are time-demultiplexed in a multiplexer 110 into an odd and even signal chain. A 1-bit toggle flip-flop 112 is clocked at one-half the analog-to-digital sample rate (Fs/2) and the 1-bit output is multiplied against the odd and even signal chain using 1-bit exclusive OR gates (EXOR) 111.

Referring again to FIG. 4, the complex multiplier 62 receives the in-phase and quadrature-phase converted signal for multiplication with the reference in-phase and quadrature-phase signal as previously explained. The reference signal may be generated by a numerically controlled oscillator outputting the complex number representation of the reference signal. The complex multiplier 62 demodulates or de-ramps the received signal into a lower bandwidth signal suitable for digitally combining with other analog-to-digital converted outputs from other elements of the phased array antenna 10.

The processed signals are digital filtered and disseminated in accumulators 66 and 67. Multiple samples accumulate in the holding registers 68 and 69. The accumulated signals are then applied to beamformer 28, see FIG. 2. In one embodiment, sixteen sequential outputs of the complex multiplier 62 accumulate prior to being output to holding registers 68 and 69.

In the embodiment utilizing 1-bit analog-to-digital converters, accumulators 66 and 67 can be implemented by a conventional adder where in the output of the complex multiplier 62 is added to multi-bit registers within accumulator 66 and 68 under the control of a synchronizing clock.

Figure 5:
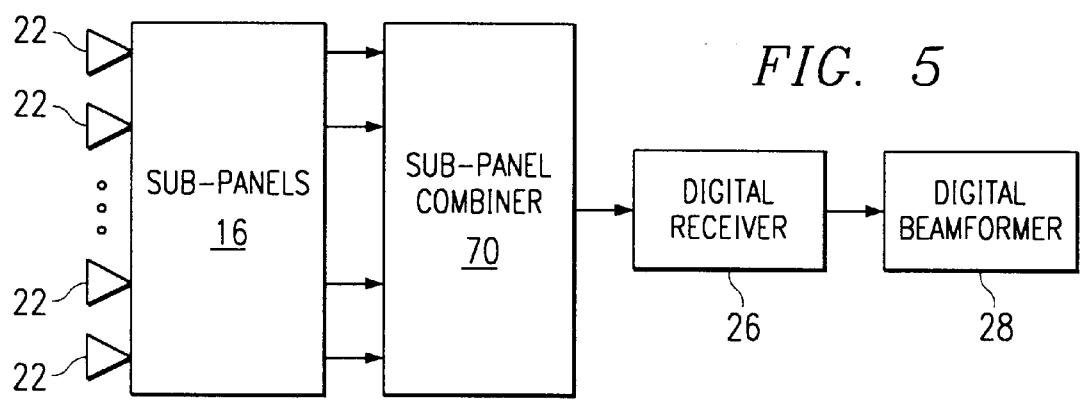
FIG. 5 is a block diagram of an alternate embodiment of a digital antenna array signal processing system for the antenna array of FIG. 1.

Referring to FIG. 5, there is shown an alternate embodiment of a digital antenna array signal processing system for the antenna array of FIG. 1. Sub-panels 16 include antenna elements 18 receiving signals 22 as previously explained. The outputs of the sub-panels 16 are applied to a sub-panel combiner 70 that receives signals from all the antenna elements 18 for combining into an output signal connected to the digital receiver 26. The output of the digital receiver 26 is applied to the beamformer 28 as described with reference to FIG. 2.

Figure 7:
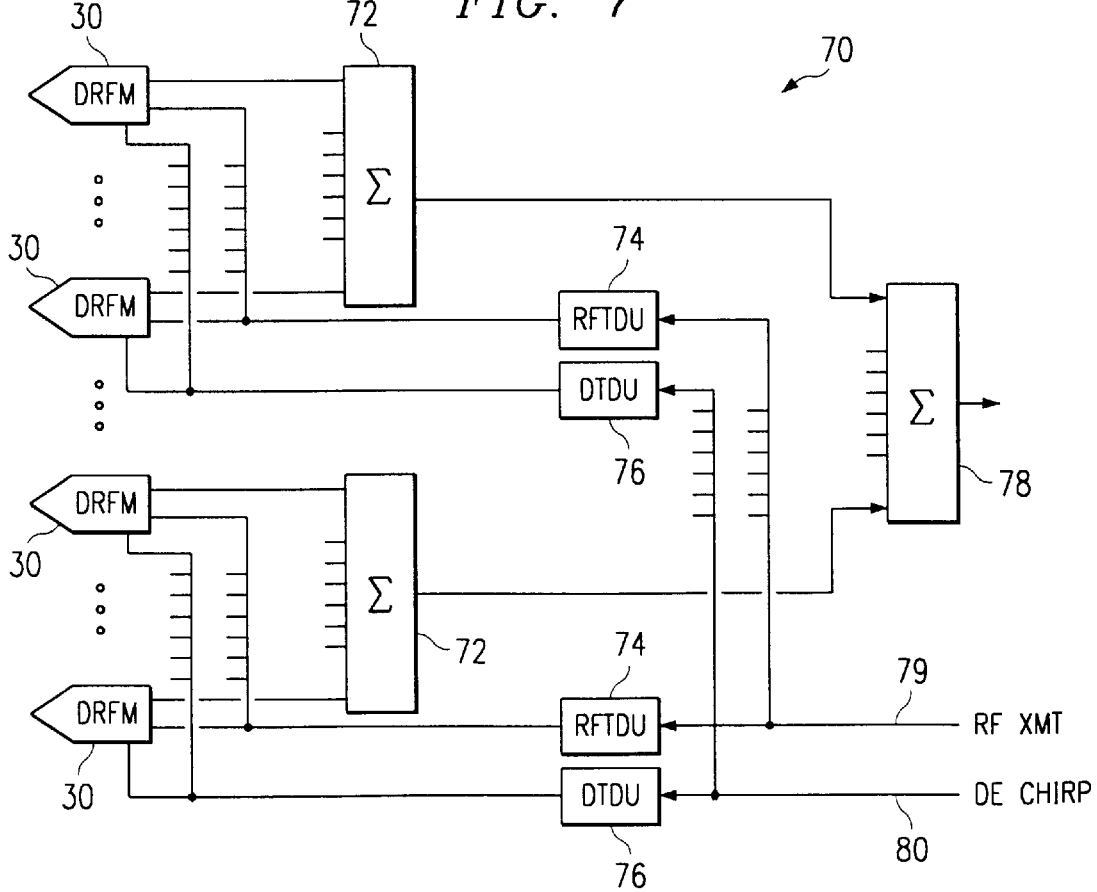
FIG. 7 is a schematic a sub-panel combiner in accordance with the teachings of the present invention.

Referring to FIG. 7, there is illustrated the sub-panel combiner 70 for use with a system in accordance with the present invention as illustrated in FIG. 5. Sub-panel combiner 70 comprises multiple digital radio frequency modules (DRFMs) 30. The outputs of several DRFMs 30 are combined in a first combiner 72. In one embodiment, the outputs of eight DRFMs 30 are combined. In a system having 512 antenna elements 18 on a sub-panel 16 and eight sub-panels are coupled to one DRFM 30 there will be DRFMs 30. If eight DRFMs 30 are connected to each combiner 72, a system requires eight first combiners 72.

Each DRFM 30 is also coupled to a digital time delay unit (DTDU) 76 and an RF time delay unit (RFTDU) 74. The digital time delay unit 76 operates to delay signals to compensate for a signal wavefront that does not reach each element 18 at the same time. DECHRIP 80 is the path of the reference signal to the DTDU 76. The RF time delay unit 74 is utilized when the antenna array 10 transmits a signal in the transmit mode. The outputs of the first combiners 72 are combined at a second combiner 78 having an output signal applied to the digital receiver 26. RFXMT 79 represents the path for signals applied to the elements 18 during the transmit mode.

Though the invention has been described with reference to a preferred embodiment and an alternate embodiment, many variations and modifications will be apparent to those skilled in the art. It is therefore the intention that the appended claims be interpreted as broadly as possible in view of the prior art to include all such variations and modifications.

What is claimed is:

1. An apparatus, comprising:
an array antenna having a plurality of spaced antenna elements for receiving an incoming electromagnetic signal;
a plurality of analog-to-digital converters each having an input and an output, said input of each said analog-to-digital converter being coupled to a respective said antenna element for receiving therefrom a respective analog signal, and each said analog-to-digital converter producing at said output thereof a respective digital signal representative of said analog signal at said input thereof;
structure responsive to said digital signals from said analog-to-digital converters for producing adjusted digital signals in a manner which includes utilizing respective time delays in regard to the respective digital signals from said analog-to-digital converters so as to compensate for said electromagnetic signal reaching respective said antenna elements at respective different points in time; and
structure for combining said adjusted digital signals into a composite digital signal, wherein said structure for producing said adjusted digital signals includes a plurality of demodulators which each convolve a respective said digital signal from a respective said analog-to-digital converter with a respective digital reference signal.

2. An apparatus according to claim 1, wherein each of said analog-to-digital converters is a multi-bit converter, said digital signal produced by each said analog-to-digital converter being a multi-bit signal.

3. An apparatus according to claim 1, wherein said structure for producing said adjusted digital signals includes time delay portions which are each responsive to a common reference signal and which each impart a respective said time delay to said common reference signal to produce said respective digital reference signals which are each supplied to a respective said demodulator.

4. An apparatus according to claim 1, wherein each of said demodulators includes a quadrature phase converter which converts said digital signal from a respective said analog-to-digital converter into an in-phase output signal and a quadrature output signal, each said adjusted digital signal being a function of a respective pair of said in-phase and quadrature output signals.

5. An apparatus according to claim 4, wherein each said quadrature phase converter includes two multipliers which each multiply said output signal from a respective said analog-to-digital converter by a respective different phase of a signal with a predetermined frequency, said analog-to-digital converters each having a sampling frequency which is a multiple of said predetermined frequency, and said in-phase and quadrature output signals of that quadrature phase converter each being a function of the output of a respective said multiplier.

6. An apparatus according to claim 5, wherein each said quadrature phase converter includes two low pass filters which each filter an output of a respective said multiplier, said in-phase and quadrature output signals of that quadrature phase converter each being a function of the output of a respective said low pass filter.

7. An apparatus according to claim 4, wherein each said quadrature phase converter includes a multiplexer having a control input responsive to a control signal with a predetermined frequency and having a data input responsive to said digital signal from a respective said analog-to-digital converter for producing odd and even output signals, includes a toggle flip-flop having said control signal applied to an input thereof, and includes two exclusive OR gates which each have one input coupled to a respective one of said odd and even output signals and a further input coupled to an output of said toggle flip-flop, said analog-to-digital converters each having a sampling frequency which is a multiple of said predetermined frequency, and said in-phase and quadrature output signals of that quadrature phase converter each being a function of the output of a respective said exclusive OR gate.

8. An apparatus according to claim 4,
wherein each of said digital reference signals includes in-phase and quadrature components; and
wherein each said demodulator includes a complex multiplier which effects complex multiplication of said in-phase and quadrature output signals of said quadrature phase converter thereof with said in-phase and quadrature components of a respective said digital reference signal to generate in-phase and quadrature values, said adjusted digital signal of that demodulator being a function of said in-phase and quadrature values.

9. An apparatus according to claim 8, wherein each said demodulator includes a first accumulator which accumulates successive said in-phase values, a second accumulator which accumulates successive said quadrature values, and first and second holding registers which are respectively responsive to the outputs of said first and second accumulators, said adjusted digital signal of each said demodulator having in-phase and quadrature components which are each a function of the output of a respective one of said first and second holding registers of that demodulator.

10. A method of operating an apparatus which includes an array antenna having a plurality of spaced antenna elements for receiving an incoming electromagnetic signal, said method including:

effecting analog-to-digital conversion of an analog signal from each said antenna element to obtain respective digital signals;

producing adjusted digital signals in a manner which includes utilizing respective time delays in regard to the respective digital signals so as to compensate for said electromagnetic signal reaching respective said antenna elements at respective different points in time, wherein said producing of said adjusted digital signals includes convolving each said digital signal with a respective digital reference signal; and combining said adjusted digital signals into a composite digital signal.

11. A method according to claim 10, wherein producing of said adjusted digital signals includes generating each of said digital reference signals by imparting respective time delays to a common reference signal.

* * * * *